(No Model.)
A. R. PARKISON.
GRATE AND GRATE BAR.
No. 254,688. Patented Mar. 7, 1882.
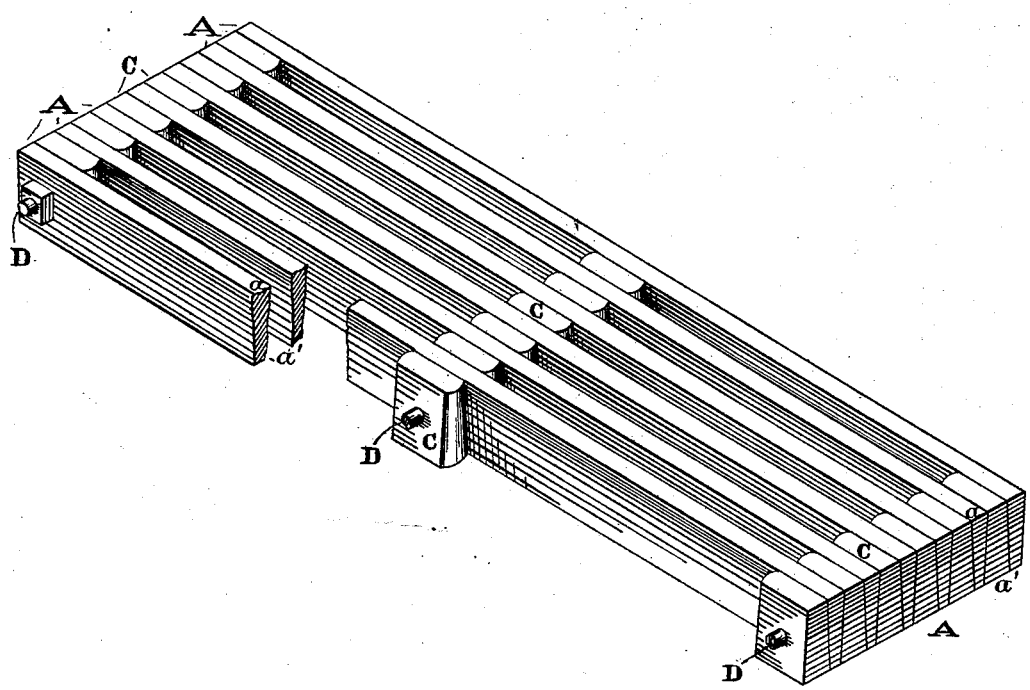
WITNESSES
INVENTOR
A. R. Parkison

UNITED STATES PATENT OFFICE.

ALLEN R. PARKISON, OF MONONGAHELA CITY, PENNSYLVANIA.

GRATE AND GRATE-BAR.

SPECIFICATION forming part of Letters Patent No. 254,688, dated March 7, 1882.

Application filed December 30, 1881. (No model.)

*To all whom it may concern:*

Be it known that I, ALLEN R. PARKISON, of Monongahela City, in the county of Washington and State of Pennsylvania, have invented certain Improvements in Grates and Grate-Bars, of which the following is a specification.

My invention consists, first, in forming grate-bars of straight-rolled strips of steel or wrought metal, such strips of steel or wrought metal being cut without waste into lengths or sections, each of which constitutes a grate-bar having a rectangular longitudinal section, or a trapezoidal longitudinal section with straight sides.

My invention consists, secondly, in combining a series of such bars with spacing-washers equal in length to the width of the bars, so that when placed in position the washers will be flush with the upper and lower faces of the bars, and securing-bolts to form a grate-section. Any number of bars may be included in a section, and any number of sections may constitute a grate. By forming grate-sections of such bars and lugs I am able to make the bars much thinner and lighter than has heretofore been practicable, and as a consequence a larger air-space and a smaller dead-surface are obtained. By making the bars in the manner stated I am enabled to produce them with great facility and economy of labor and material, as will be fully set forth.

The accompanying drawing is a perspective view, partly broken away, of a section of a grate embodying my invention.

The grate-bars A are made of straight-rolled steel or wrought metal, preferably tapered or inclined on one or both sides from the upper edge, a, to the lower edge, a'. In the drawing the bars are shown as inclined on each face. Grate-bars of this description are only different from the ordinary merchant iron or steel in that they are formed with inclined or beveled sides or faces, as described. They can, however, be manufactured with the same facility and economy with which the ordinary bar steel or wrought-iron is produced for the trade.

Bars of metal, of which the grate-bars are to be formed, can be rolled of any suitable cross-section and then cut into lengths constituting grate-bars. The ends of the bars may be cut off at right angles, or they may be cut on an incline, so as to form a trapezoidal-shaped bar, or one in which the opposite ends are not parallel, but are straight. In either case there will be no waste of metal. The utility, economy, and practical advantages of thus manufacturing them will be obvious.

In order to form a grate-section, as above mentioned, I punch bolt-holes in the bars, preferably at each end and at the middle. Suitable metal washers or spacing-blocks, C, having inclined faces and equal in length to the width of the bars, are placed between the bars with their inclined faces in the reversed position to the inclined faces of the grate-bars, so that a cross-section through the washers and grate-bars will be rectangular. Bolt-holes are also punched in the washers, and the bars and washers are firmly secured together by through-bolts B. The washers at the ends of the grate-section are also arranged to be flush with the ends of the bars, as well as with their upper and lower faces, as shown in the drawing. Each grate-section is firmly, compactly, and rigidly united, and, owing to the effective support and bracing of the grate-bars by the spacing-washers the entire width of the bars at each end and at the middle, and to the clamping-bolts, is of very great strength and is not liable to become distorted in use.

In case of breakage of any of the grate-bars in a section, the section may be taken apart and the damage repaired with facility. The grate-sections are of course interchangeable, so that one may be replaced by another as occasion requires.

As above remarked, by using metal of this character the grate-bars may be made with economy and much stronger, lighter, and thinner than where cast metal is used; and I am enabled, therefore, to produce a grate having a very large draft or air space at the bottom a' and a comparatively small dead-surface, a, so that a more thorough combustion is insured and the lodging or formation of clinker or cinder is in a great measure prevented.

Each grate-section may be ten inches (more or less) in width, and the width of the spacing-washers may be varied according to the requirements in each case, and according to the character of the fuel burned. The grate-bars may be made three-eighths of an inch on the upper edge and one-fourth of an inch on the lower edge; but of course I do not limit myself to any particular dimensions or to any particular shape or cross-section of bar.

I am aware that grate-bars formed of steel are not new, and that steel grate-bars with spacing-lugs connected with each grate-bar are not new, they being shown in the patent of W. C. Childs, No. 168,615, granted October 11, 1875. In that patent, however, the grate-bars are formed of an irregular longitudinal section, and cannot be manufactured in the manner herein described, nor are the grate-bars united by bolts to form grate-sections, nor do the spacing-lugs brace and support the grate-bars, as in my organization. I therefore make no claim to such subject-matter, or to any subject-matter disclosed in that patent; but I distinctly limit myself to my specific construction and organization.

I am also aware that it is not new to form a grate-section by combining grate-bars, spacing-washers, and securing-bolts, such being shown in the patent of J. A. Allen, No. 212,531, granted February 25, 1879. I therefore make no claim to such subjects-matter, or to any subjects-matter disclosed in these patents; but I distinctly limit myself to the specific features herein set forth.

I claim—

1. The steel or wrought-metal grate-bar herein described, of the shape set forth, and cut without waste from a straight-rolled strip of steel or wrought metal.

2. The combination of the grate-bars, formed, as set forth, of sections of straight-rolled steel or wrought metal, spacing-washers which are flush with the upper and lower faces of the bars and brace them their entire width, and the securing-bolts, substantially as and for the purpose set forth.

In testimony whereof I have hereunto subscribed my name this 21st day of December, 1881.

A. R. PARKISON.

Witnesses:
 D. H. WILLIAMS,
 S. P. KELLER.